(12) United States Patent
Shinozaki et al.

(10) Patent No.: US 7,704,008 B2
(45) Date of Patent: Apr. 27, 2010

(54) SHAFT FIXING CLIP AND SHAFT FIXING STRUCTURE USING THE CLIP

(75) Inventors: Nobuya Shinozaki, Kanagawa (JP); Kenji Morita, Kanagawa (JP); Masanari Yasuda, Tochigi (JP)

(73) Assignees: Piolax, Inc., Kanagawa (JP); TS Tech Co., Ltd., Saitama (JP)

( * ) Notice: Subject to any disclaimer, the term of this patent is extended or adjusted under 35 U.S.C. 154(b) by 0 days.

(21) Appl. No.: 11/523,072

(22) Filed: Sep. 19, 2006

(65) Prior Publication Data

US 2007/0071578 A1    Mar. 29, 2007

(30) Foreign Application Priority Data

Sep. 20, 2005    (JP)    ............................ P2005-271560

(51) Int. Cl.
  *F16B 21/18*    (2006.01)
  *F16B 21/16*    (2006.01)
(52) U.S. Cl. ........................ 403/397; 403/155; 403/310; 403/327; 24/567; 411/530
(58) Field of Classification Search ................. 403/397, 403/155, 163, 372, 11, 309, 310, 313, 327, 403/360; 24/567; 411/530, 516; 285/305
See application file for complete search history.

(56) References Cited

U.S. PATENT DOCUMENTS

| | | | | |
|---|---|---|---|---|
| 1,232,528 | A | * | 7/1917 | Gemmill |
| 1,644,298 | A | * | 10/1927 | Ledbetter .................... 411/516 |
| 2,301,786 | A | * | 11/1942 | Millermaster ................ 174/51 |
| 2,948,317 | A | * | 8/1960 | Munro |
| 3,139,768 | A | * | 7/1964 | Biesecker ................... 403/372 |
| 3,164,054 | A | * | 1/1965 | Biesecker ................... 403/163 |
| 3,298,409 | A | * | 1/1967 | Elson ......................... 403/326 |
| 3,314,696 | A | * | 4/1967 | Ferguson et al. ............ 285/305 |
| 3,438,686 | A | * | 4/1969 | Stone |

(Continued)

FOREIGN PATENT DOCUMENTS

DE    3731149 A1 *  3/1989

(Continued)

OTHER PUBLICATIONS

Chinese Office Action dated Aug. 28, 2009 with English Translation.

*Primary Examiner*—Daniel P Stodola
*Assistant Examiner*—Ernesto Garcia
(74) *Attorney, Agent, or Firm*—McGinn IP Law Group, PLLC (57) ABSTRACT

A shaft fixing clip that is fitted into a groove of a shaft, the shaft fixing clip includes: a shaft clamping portion that is formed by a metal wire member; and a pinch portion that is monolithically formed with the shaft clamping portion, wherein: the metal wire member is bent into an 8-like shape; both end portions of the metal wire member are crossed in an end portion of one of loops to respectively protrude toward both sides; tip ends of the both end portions are bent; the loop that is positioned on a side of the both end portions is configured as the shaft clamping portion; and bent portions of the tip ends of the both end portions are configured as the pinch portion.

9 Claims, 7 Drawing Sheets

U.S. PATENT DOCUMENTS

| | | | | |
|---|---|---|---|---|
| 3,477,309 | A | * | 11/1969 | Sprecher |
| 3,698,747 | A | * | 10/1972 | Wing et al. ............... 285/305 |
| 3,805,337 | A | * | 4/1974 | Branstetter |
| 4,009,896 | A | * | 3/1977 | Brewer ..................... 285/305 |
| 4,352,586 | A | * | 10/1982 | Hayden ..................... 403/163 |
| 4,600,221 | A | * | 7/1986 | Bimba ....................... 285/305 |
| 4,697,948 | A | * | 10/1987 | Fukuda ..................... 403/155 |
| 4,705,352 | A | * | 11/1987 | Margolin et al. |
| 4,750,886 | A | * | 6/1988 | Portelli et al. ............ 403/163 |
| 4,805,870 | A | * | 2/1989 | Mertz .................... 251/129.15 |
| 4,813,716 | A | * | 3/1989 | Lalikos et al. .......... 285/148.14 |
| 4,867,487 | A | * | 9/1989 | Phillis ....................... 285/305 |
| 4,874,174 | A | * | 10/1989 | Kojima et al. .............. 285/82 |
| 4,884,829 | A | * | 12/1989 | Funk et al. ................ 285/305 |
| 4,909,370 | A | * | 3/1990 | Limbacher et al. ......... 403/326 |
| 4,923,272 | A | * | 5/1990 | Cuda ........................... 385/55 |
| 5,145,265 | A | * | 9/1992 | Flem |
| 5,407,289 | A | * | 4/1995 | Pebre ....................... 403/252 |
| 5,518,332 | A | * | 5/1996 | Katoh ....................... 285/305 |
| 5,704,100 | A | * | 1/1998 | Swan |
| 6,178,844 | B1 | * | 1/2001 | Burger .................... 74/502.4 |
| 6,254,163 | B1 | * | 7/2001 | Schofield ................ 296/65.13 |
| 6,490,947 | B2 | * | 12/2002 | Burger .................... 74/502.4 |
| 2005/0179313 | A1 | * | 8/2005 | Liu |

FOREIGN PATENT DOCUMENTS

| | | | |
|---|---|---|---|
| FR | 1555350 | * | 12/1968 |
| GB | 793168 | * | 4/1958 |
| GB | 1331504 | | 9/1973 |
| JP | 2-64349 | | 5/1990 |
| JP | 8-219352 | | 8/1996 |
| JP | 2001-221221 | | 8/2001 |
| JP | 2001-299503 | | 10/2001 |
| JP | 2002-199964 | | 7/2002 |
| JP | 2004-211891 | | 7/2004 |
| JP | 2005-507066 | | 3/2005 |
| JP | 39-28931 | | 10/2009 |

* cited by examiner

SHAFT FIXING CLIP AND SHAFT FIXING STRUCTURE USING THE CLIP

BACKGROUND OF THE INVENTION

1. Field of the Invention

The present invention relates to a shaft fixing clip which is used for lockingly fixing an end portion of a shaft inserted into a mounting hole of, for example, a bracket, with respect to the mounting hole, and also to a shaft fixing structure using the clip.

2. Description of the Related Art

For example, an armrest of an automobile is swingably fixed in the following manner. A shaft inserted into the armrest is inserted into a mounting hole of a bracket disposed on a support frame, and a clip having a U-like shape or the like is locked by being fitted into a peripheral groove formed in an end portion of the shaft projected from the mounting hole, thereby fixing the armrest. In order to prevent the shaft and the mounting hole from rattling, a resin-made bush is interposed between the inner periphery of the mounting hole and the outer periphery of the shaft.

JP-A-8-219352 below discloses a pipe joint in which a plug is inserted into a socket comprising a slit into which a snap retainer is to be inserted, in a peripheral wall, and the snap retainer is fitted into an engagement groove disposed in a peripheral face of the plug, thereby sealingly connecting the socket and the plug together. In the pipe joint, a fastener for preventing the snap retainer from dropping out is disposed on the socket, and the position of the snap retainer is made adequate during a time period beginning before a connecting work and continuing even after the work, whereby the connection between the socket and the plug is facilitated and a sure connection state can be maintained.

SUMMARY OF THE INVENTION

In the conventional shaft fixing structure, locking is performed by fitting the U-like clip into the peripheral groove formed in the end portion of the shaft. When an impact force due to a rear-end collision of the vehicle or the like acts on the structure, there is a possibility that the shaft bends, the clip disengages from the shaft, and the shaft drops out of the mounting hole of the bracket.

In the pipe joint of JP-A-8-219352, the snap retainer inserted into the slit of the socket is held by the fastener to prevent the snap retainer from dropping out. Since the fastener is required, the number of parts is increased. Consequently, there arise problems in that the structure is complicated, and that the attachment workability is poor.

Therefore, it is an object of the invention to provide a shaft fixing clip which can surely prevent a shaft from dropping out of a mounting hole, which is simply structured, and which has an excellent workability, and a shaft fixing structure using the clip.

According to a first aspect of the invention, there is provided a shaft fixing clip that is fitted into a groove of a shaft, the shaft fixing clip including; a shaft clamping portion that is formed by a metal wire member; and a pinch portion that is monolithically formed with the shaft clamping portion, wherein: the metal wire member is bent into an 8-like shape; both end portions of the metal wire member are crossed in an end portion of one of loops to respectively protrude toward both sides; tip ends of the both end portions are bent; the loop that is positioned on a side of the both end portions is configured as the shaft clamping portion; and bent portions of the tip ends of the both end portions are configured as the pinch portion.

According to the first aspect of the invention, when the pinch portions are pinched, the loop positioned on the side of the both end portions is expanded to enable the clip to be attached to the outer periphery of the shaft, and, when the hand is released from the pinch portions, the diameter of the loop is contracted to enable the clip to be fitted into the groove of the shaft. At this time, the loop in the head portion of the 8-like shape provides a strong spring force which hardly collapses, and hence the clip can be firmly fitted into the groove of the shaft. Furthermore, the clip is fitted into the groove of the shaft by the closed loop. Even when a strong drop-out force acts on the shaft, therefore, the clip hardly disengages from the groove of the shaft, and the shaft can be securely held only by the clip.

According to a second aspect of the invention, the pinch portion is formed by bending the tip ends of the both end portions of the metal wire member in an axial direction of the shaft to be clamped.

According to the second aspect of the invention, when the pinch portions of the clip are pinched, the bent portions bump against the fingers, and hence a force can be easily applied to the pinch portions.

According to a third aspect of the invention, the pinch portion is formed by bending the tip ends of the both end portions of the metal wire member in the axial direction of the shaft to be clamped, and in a same direction.

According to the third aspect of the invention, when the pinch portions of the clip are pinched, the axially bent portions are located in corresponding positions on the both sides. When the pinch portions of the clip are pinched, therefore, a force can be more easily applied to the pinch portions.

According to a fourth aspect of the invention, there is provided a shaft fixing structure including: a shaft fixing clip including: a shaft clamping portion that is formed by a metal wire member; a pinch portion that is monolithically formed with the shaft clamping portion; a bush including: a cylindrical portion that is to be inserted with being in close contact with an inner periphery of a mounting hole of a bracket; a flange that is formed on one end of the cylindrical portion, and is engaged with one face of the mounting hole; one slit that separates the cylindrical portion and the flange in an axial direction; and a pair of circumferential slits that are circumferentially formed and respectively in both sides of the slit across the slit, wherein; the metal wire member is bent into an 8-like shape; both end portions of the metal wire member are crossed in an end portion of one of loops to respectively protrude toward both sides; tip ends of the both end portions are bent; the loop that is positioned on a side of the both end portions is configured as the shaft clamping portion; bent portions of the tip ends of the both end portions are configured as the pinch portion; the cylindrical portion of the bush is inserted into the mounting hole; the clip is fittingly attached to the circumferential slits formed in the cylindrical portion that is projected from the mounting hole; and a shaft is inserted into the bush, and the clip is fitted into a groove of the shaft.

According to the fourth aspect of the invention, the cylindrical portion of the bush is inserted into the mounting hole of the bracket, and the clip is fittingly attached to the circumferential slits of the cylindrical portion projected from the mounting hole. When, in this state, an end portion of the shaft is inserted into the bush attached to the mounting hole, the shaft slides while the clip is expanded by the end portion of the shaft to clamp the outer periphery of the shaft. When the clip reaches the groove of the shaft, the clip is fitted into the groove, thereby performing fixing.

In this way, fixing is performed simply by previously attaching the bush and the clip to the mounting hole of the bracket, and then inserting the shaft, and hence the workability of attachment of the shaft can be improved. Even when the end portion of the shaft is in a narrow gap and the clip is hardly attached, moreover, the work of fixing the shaft can be easily performed.

According to a fifth aspect of the invention, the shaft fixing structure of the fourth aspect of the invention, further includes a convex portion that is to be engaged with a peripheral edge of the mounting hole of the bracket, and is formed between the pair of circumferential slits.

According to the fifth aspect of the invention, when the cylindrical portion of the bush is inserted into the mounting hole of the bracket, the convex portion formed on the cylindrical portion is projected, and engaged with the opening edge of the mounting hole, thereby performing locking. Since the convex portion is disposed between the pair of circumferential slits, the plate thickness of the portion between the slits can be increased by the degree corresponding to the height of the convex portion, and therefore the strength of the cylindrical portion can be enhanced.

According to a sixth aspect of the invention, the shaft fixing structure of the fourth or the fifth aspect of the invention, further includes a peripheral wall that extends from a tip end opposite to the flange of the cylindrical portion, to the pair of circumferential slits, wherein portions of the peripheral wall, which correspond respectively to middles of the pair of circumferential slits, are thinned to reduce an outer diameter of the peripheral wall.

According to the sixth aspect of the invention, the clip is pinched by the fingers to expand the loop, the cylindrical portion of the bracket is inserted into the inside of the loop, and fitting into the slit is performed. At this time, even when the expansion width of the loop of the clip is relatively small, the cylindrical portion can be inserted because the outer diameter of the portions corresponding to the middles of the circumferential slits is reduced. Therefore, the force by which the both end portions of the clip is pinched can be reduced.

According to the shaft fixing clip of the invention, the loop is expanded by pinching the pinch portions so as to be easily fitted into the groove of the shaft. Since the loop in the head portion of the 8-like shape provides a strong spring force which hardly collapses, the clip can be firmly fitted into the groove of the shaft. Furthermore, the clip is fitted into the groove of the shaft by the closed loop. Even when a strong drop-out force acts on the shaft, therefore, the clip hardly disengages from the groove of the shaft, and the shaft can be securely held only by the clip.

According to the shaft fixing structure, fixing is performed simply by previously attaching the bush and the clip to the mounting hole of the bracket, and inserting the shaft, and hence the workability of attachment of the shaft can be improved. Even when the end portion of the shaft is in a narrow gap and the clip is hardly attached, moreover, the work of fixing the shaft can be easily performed.

BRIEF DESCRIPTION OF THE DRAWINGS

These and other objects and advantages of this invention will become more fully apparent from the following detailed description taken with the accompanying drawings in which.

DETAILED DESCRIPTION OF THE EMBODIMENTS

Hereinafter, an embodiment of the invention will be described with reference to the accompanying drawings.

Figure 1:
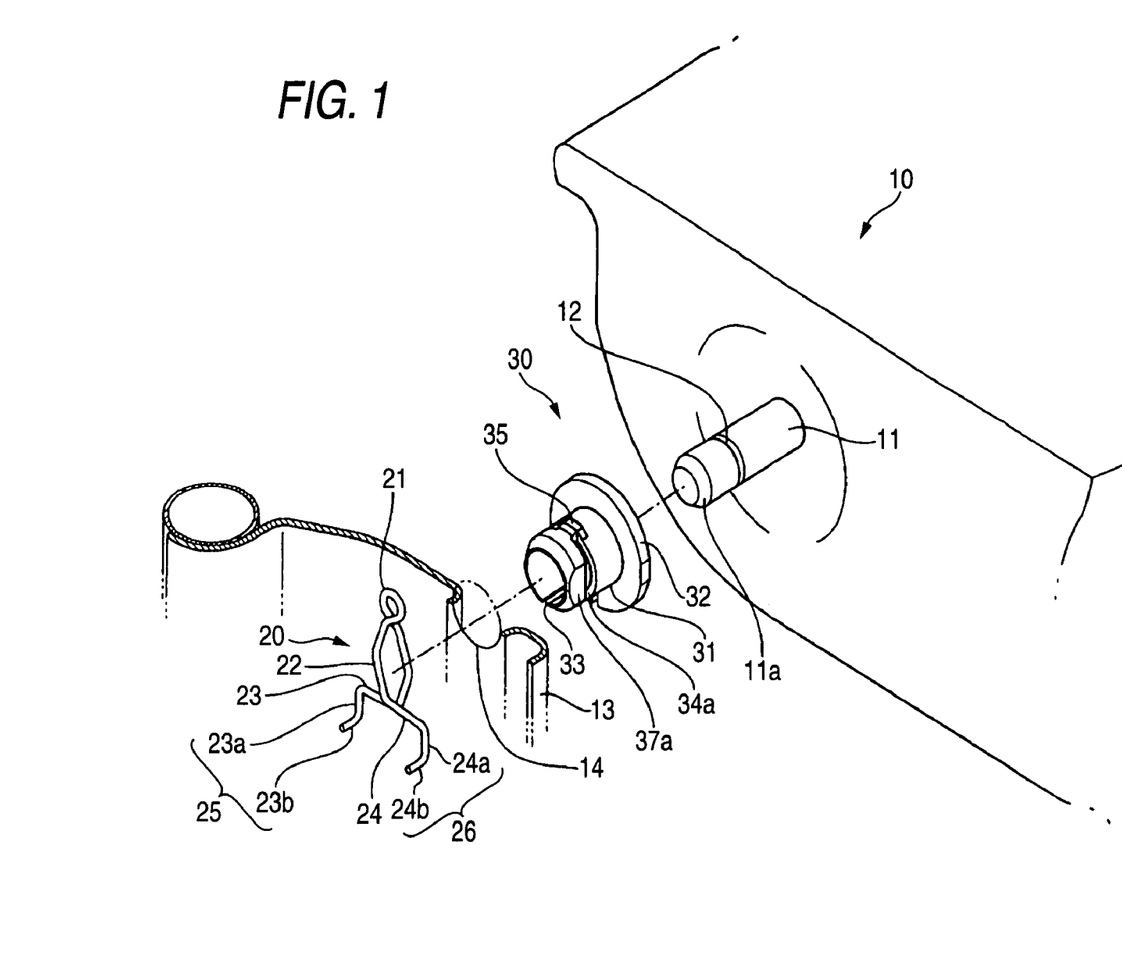
FIG. 1 is an exploded perspective view showing an embodiment of the shaft fixing structure of the invention.

FIG. 1 is an exploded perspective view showing an embodiment of the shaft fixing structure of the invention.

The shaft fixing structure is used for inserting a shaft 11 into an armrest 10 of an automobile, and inserting and fixing an end portion of the shaft 11 into a mounting hole 14 of a bracket 13.

The shaft fixing structure is configured by: the shaft 11; the bracket 13; a resin-made bush 30 which is inserted into the inner periphery of the mounting hole 14 of the bracket 13; and a clip 20 which is fitted into a groove 12 formed in the outer periphery of an end portion of the shaft 11, to prevent the shaft 11 from dropping out. A tapered face 11a is formed on the outer periphery of a tip end portion of the shaft 11. The clip 20 constitutes also an embodiment of the shaft fixing structure of the invention.

Figure 2:
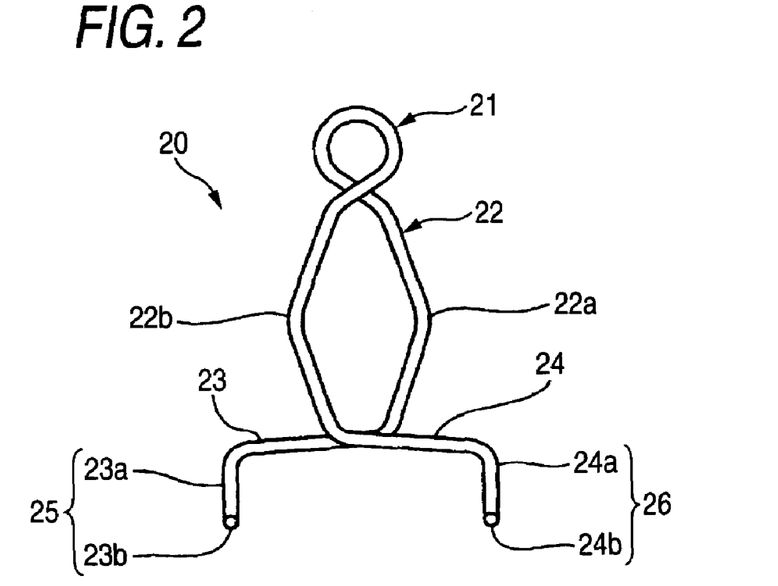
FIG. 2 is a front view of a clip which is used in the shaft fixing structure.
Figure 3:
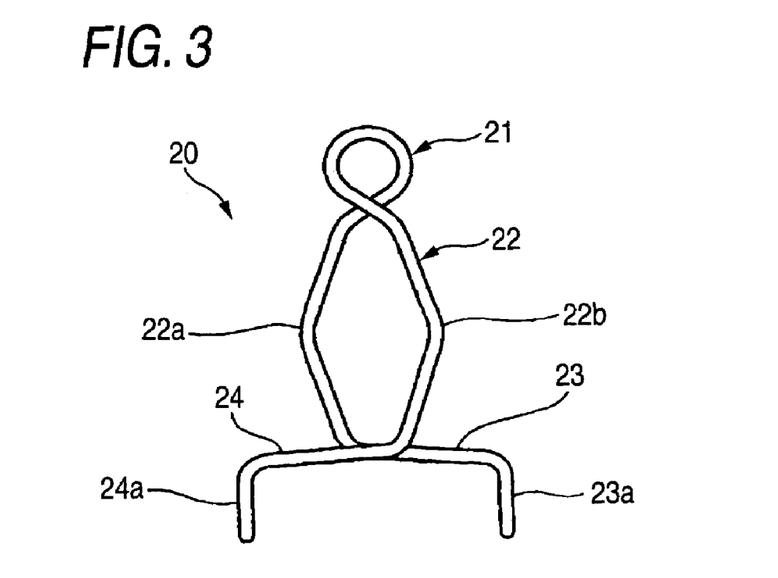
FIG. 3 is a rear view of the clip.
Figure 4:
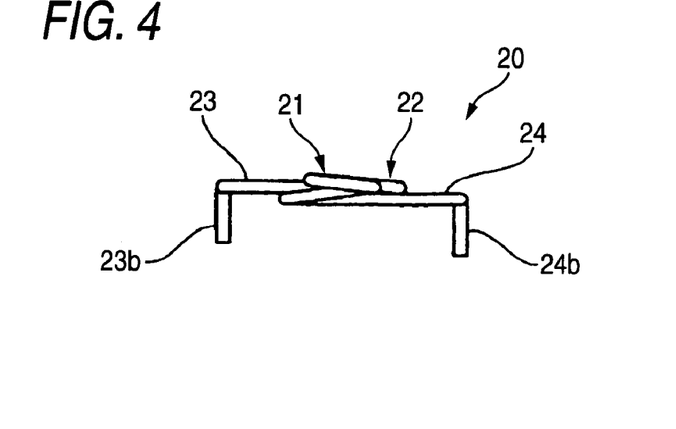
FIG. 4 is a plan view of the clip.
Figure 5:
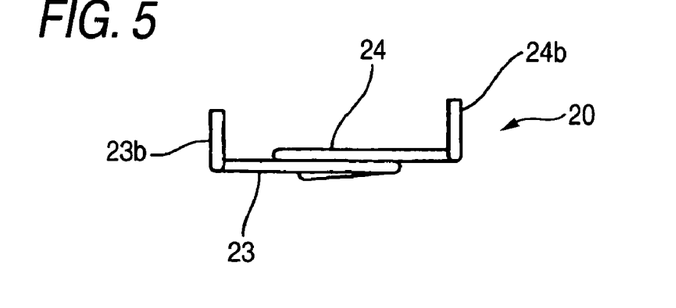
FIG. 5 is a bottom view of the clip.
Figure 6:
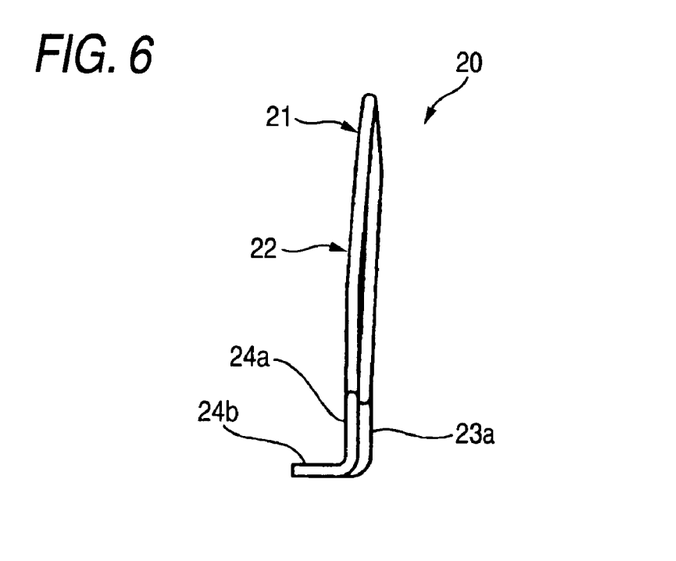
FIG. 6 is a right side view of the clip.
Figure 7:
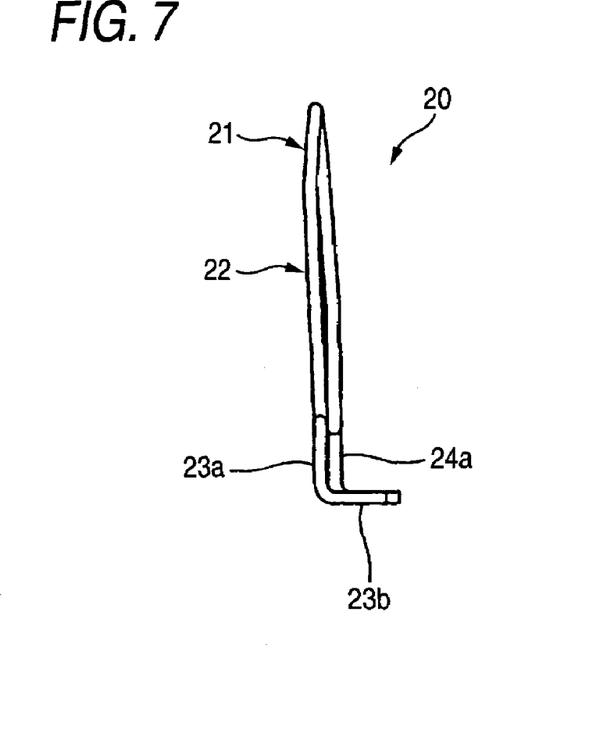
FIG. 7 is a left side view of the clip.

FIGS. 2 to 7 show the clip 20, FIG. 2 is a front view, FIG. 3 is a rear view, FIG. 4 is a plan view, FIG. 5 is a bottom view, FIG. 6 is a right side view, and FIG. 7 is a left side view.

The clip 20 is formed by bending a metal wire member such as a spring steel wire. The clip 20 has a first loop 21 which is formed by bending a substantially middle portion of the metal wire member into a small circular shape, and a second loop 22 which is disposed below the first loop 21.

The second loop 22 has an approximately rhombic shape which is formed by bending middle portions 22a, 22b of the both sides of the wire member into an L-like shape. In a lower end portion of the second loop 22, both end portions 23, 24 of the metal wire member are crossed to form a closed loop, and elongated toward the outside.

The end portions 23, 24 are bent into an L-like shape along the plane of the loops 21, 22 to be formed as first bent portions 23a, 24a, and portions which are nearer to tip end portions in relation to the first bent portions 23a, 24a are bent into an L-like shape in the same direction and substantially perpendicular to the plane including the loops 21, 22, to be formed as second bent portions 23b, 24b. The second bent portions 23b, 24b have a shape which, when the clip 20 is attached to the outer periphery of the shaft 11, elongates in the axial direction of the shaft 11.

In the end portions 23, 24, the first bent portions 23a, 24a and the second bent portions 23b, 24b are configured as pinch portions 25, 26 which are to be used when the clip 20 is pinched by the fingers. Because of the first and second loops 21, 22, the clip 20 is bent as a whole into an 8-like shape to provide a spring force by which, when the pinch portions 25, 26 are pinched to be closed, the first loop 21 urges the wire members of the both sides of the second loop 22 in the closing direction.

Figure 8:
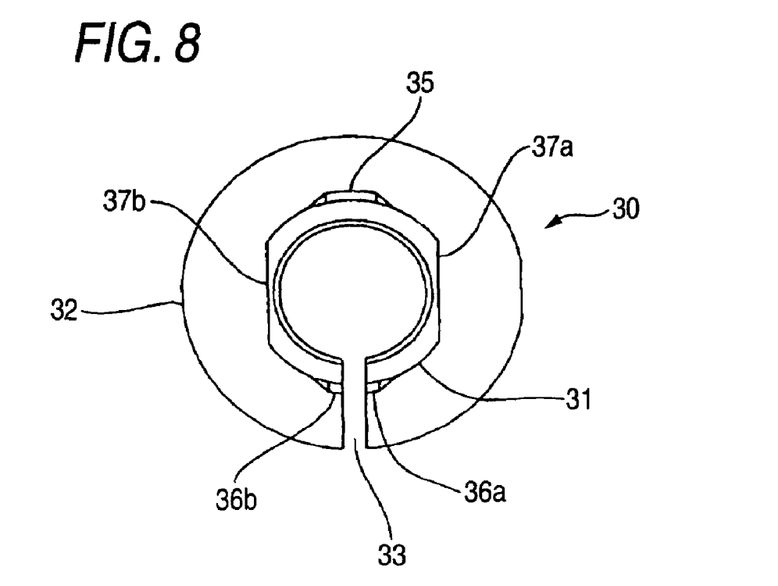
FIG. 8 is a front view of a bush which is used in the shaft fixing structure of the invention.
Figure 9:
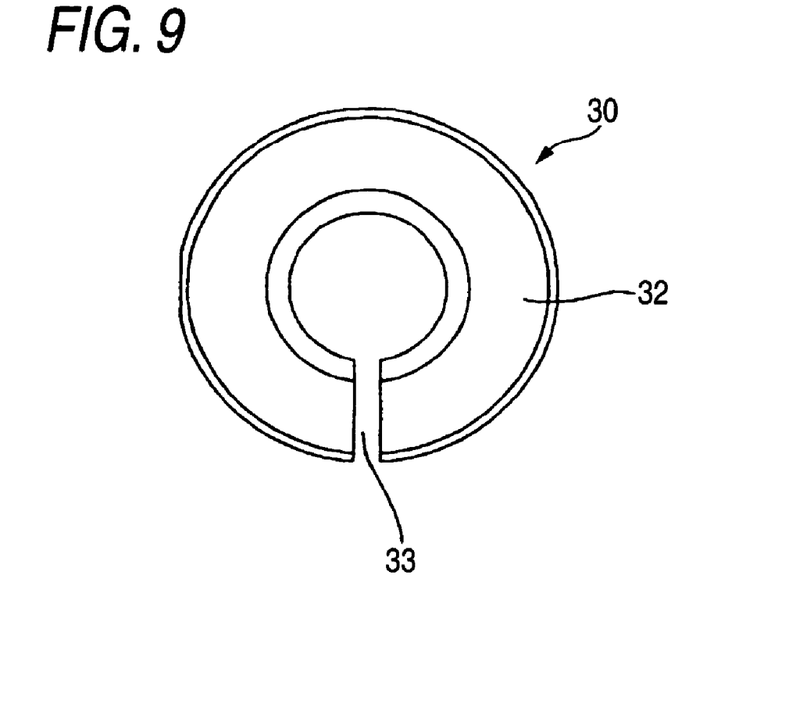
FIG. 9 is a rear view of the bush.
Figure 10:
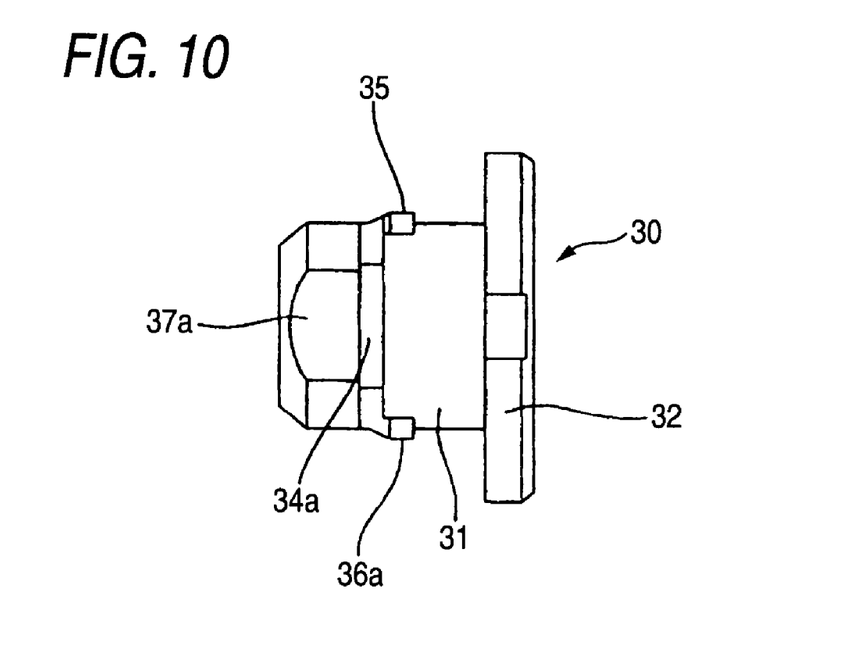
FIG. 10 is a right side view of the bush.
Figure 11:
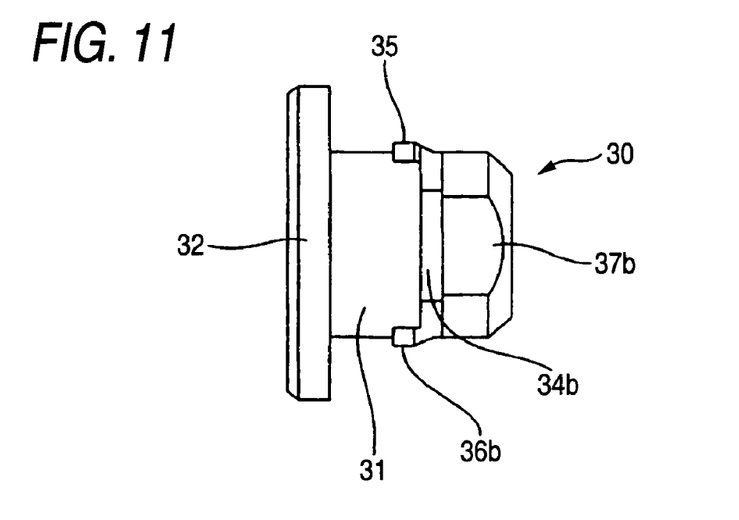
FIG. 11 is a left side view of the bush.
Figure 12:
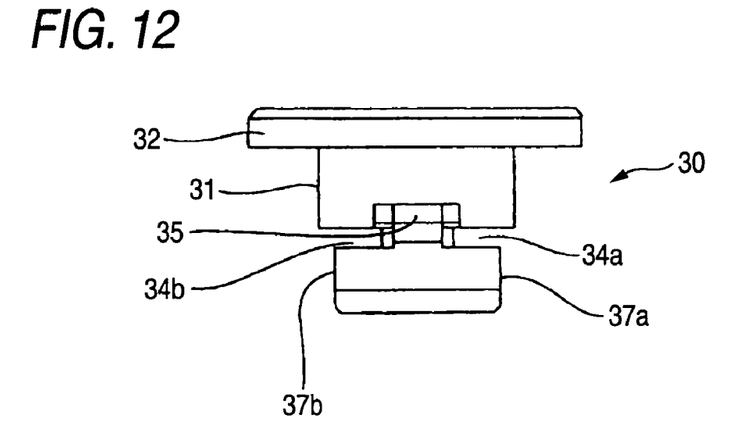
FIG. 12 is a plan view of the bush.
Figure 13:
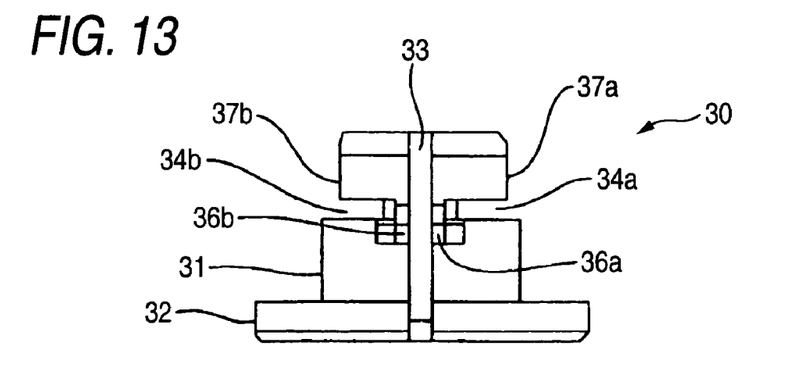
FIG. 13 is a bottom view of the bush.

FIGS. 8 to 13 show the bush 30, FIG. 8 is a front view of the bush 30, FIG. 9 is a rear view, FIG. 10 is a right side view, FIG. 11 is a left side view, FIG. 12 is a plan view, and FIG. 13 is a bottom view.

The bush 30 has: a cylindrical portion 31 which is to be inserted into the mounting hole 14 of the bracket 13; and a flange 32 which extends in an outer radial direction from one end portion of the cylindrical portion 31.

The cylindrical portion 31 and the flange 32 have a slit 33 which is formed by cutting away one circumferential place. When the cylindrical portion 31 is to be inserted into the mounting hole 14, the slit 33 causes the diameter of the cylindrical portion 31 to be elastically reduced, thereby enabling the insertion into the mounting hole 14.

A pair of circumferential slits 34a, 34b are formed on the both sides of the cylindrical portion 31 across the slit 33, respectively. The second loop 22 of the clip 20 is to be fitted into the circumferential slits 34a, 34b.

Convex portions 35, 36a, 36b which are to be engaged with the mounting hole 14 are formed such that the circumferential slits 34a, 34b are between the convex portion 35, 36a, 36b. The convex portion 35 is formed on the peripheral face opposite to the slit 33, and the convex portions 36a, 36b are formed on both sides of the slit 33 across the slit 33. In each of the convex portions 35, 36a, 36b, a tapered face is formed in which the diameter is gradually reduced as advancing toward the tip end of the cylindrical portion 31, and an end portion on the side of the basal portion of the cylindrical portion 31 is formed as an engaging step.

When the cylindrical portion 31 is inserted into the mounting hole 14 of the bracket 13, therefore, the diameter of the cylindrical portion 31 is elastically reduced because of the slit 33. At the timing when the convex portions 35, 36a, 36b pass the mounting hole 14 and escape therefrom, the engaging steps of the convex portions 35, 36a, 36b on the side of the basal portion engage with the opening edge of the mounting hole 14, thereby locking the bush 30. As a result, the flange 32 of the bush 30 is engaged with one face of the mounting hole 14, and the convex portions 35, 36a, 36b are engaged with the opposite face of the mounting hole 14, so that the bush 30 is firmly fixed to the mounting hole 14.

In a region of the cylindrical portion 31 which extends from the tip end portion to the circumferential slits 34a, 34b, thinned portions 37a, 37b which are formed by cutting away the both sides of the outer periphery by parallel planes are disposed in portions which are situated in the same circumferential positions as the pair of circumferential slits 34a, 34b. The outer diameter of the portion where the thinned portions 37a, 37b are disposed is smaller than that of the other portion of the cylindrical portion 31.

Next, the procedure of fixation of a shaft in which the shaft fixing structure of the invention is used will be described. First, the cylindrical portion 31 of the bush 30 is inserted into the mounting hole 14 of the bracket 13, and the convex portions 35, 36a, 36b are engaged with the peripheral edge of the mounting hole 14 as described above, thereby attaching the bush 30 to the bracket 13.

The pinch portions 25, 26 of the end portions 23, 24 of the clip 20 are pinched by the fingers in this state to expand the second loop 22. Then, the clip 20 is placed on the outer periphery of the cylindrical portion 31 of the bush 30 while the cylindrical portion 31 is inserted into the expanded second loop 22. The wire members of the both sides of the second loop 22 are fitted into the circumferential slits 34a, 34b of the cylindrical portion 31.

Figure 14A:
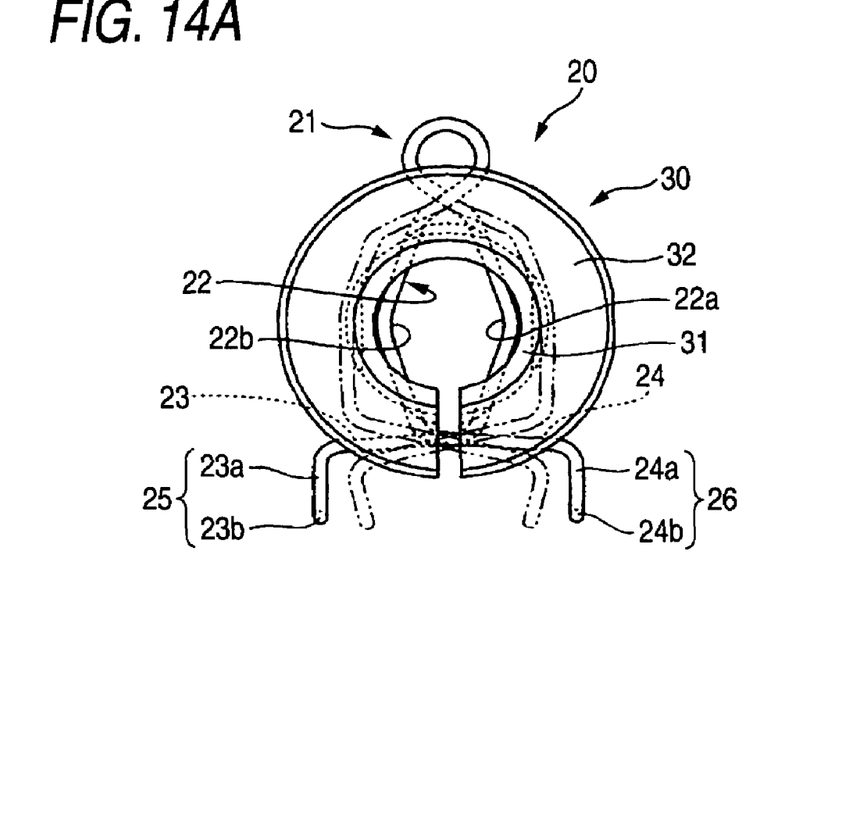
FIG. 14A is a diagram showing states of the clip before and after a shaft is inserted.

When the clip 20 is pinched, the second loop 22 is expanded so that portions below the middle portions 22a, 22b of the both sides of the second loop are substantially parallel to each other (see the phantom lines in FIG. 14). The cylindrical portion 31 is inserted into the second loop 22 so that the expanded portions are located on the thinned portions 37a, 37b of the cylindrical portion 31, thereby enabling the clip 20 to be placed on the outer periphery of the cylindrical portion 31 even when the clip 20 is not so largely expanded. Therefore, the pinch force to be applied on the clip 20 can be reduced.

In the state where the clip 20 is fitted into the circumferential slits 34a, 34b of the cylindrical portion 31 in this way, the end portion of the shaft 11 which is passed through the armrest 10 is inserted into the bush 30.

FIG. 14A shows the state of the second loop 22 of the clip 20 before the shaft 11 is inserted. In the figure, the state where the second loop 22 is expanded by inserting the shaft 11 is indicated by the phantom lines. At this time, the second loop 22 of the clip 20 enters the inner peripheral side of the cylindrical portion 31 through the circumferential slits 34a, 34b.

When the shaft 11 is inserted into the bush 30 in this state, the tapered face 11a on the outer periphery of the tip end portion of the shaft 11 enters the inner side of the second loop 22 of the clip 20 which is previously attached to the bush 30, and is inserted while pushing and expanding the second loop 22 from the inner side. When the clip 20 reaches the groove 12 of the shaft 11, the both-side wire members of the second loop 22 of the clip 20 are fitted into the groove 12 of the shaft 11, whereby the shaft 11 can be fixed to the mounting hole 14 of the bracket 13.

Figure 14B:
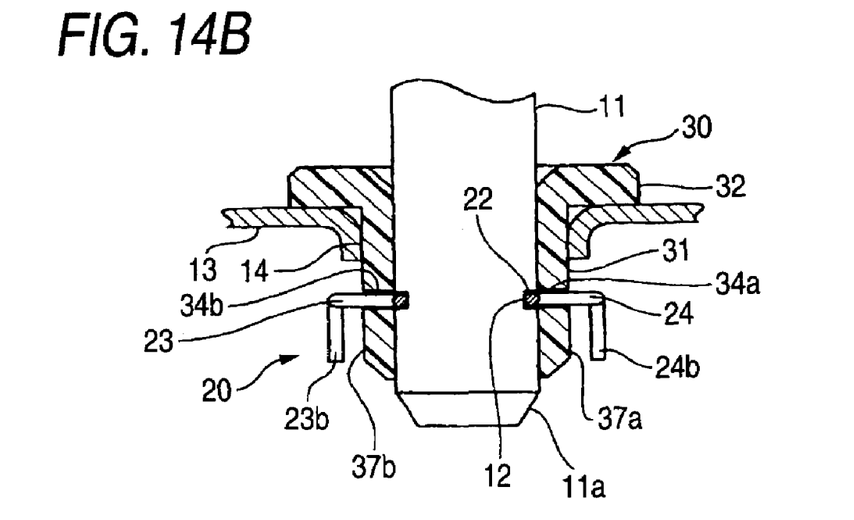
FIG. 14B is a section view showing a state where the shaft is fixed to a bracket.

FIG. 14B is a section view showing the state where the second loop 22 of the clip 20 is fitted into the groove 12 of the shaft 11, and the shaft 11 is fixed.

In this way, the shaft 11 is fixed to the mounting hole 14 of the bracket 13 by fitting the closed second loop 22 of the clip 20 into the groove 12. In this state, even when a strong drop-out force acts on the shaft 11, the closed second loop 22 allows the clip 20 fitted into the groove 12 of the shaft 11 not to drop out of the shaft 11, and to withstand against the drop-out force acting on the shaft 11. Therefore, the shaft 11 can be firmly held.

What is claimed is:

1. A shaft fixing structure, comprising:
   a bracket that fixes en end portion of a shaft;
   a shaft fixing clip comprising:
      a first loop at a middle of a metal wire member leaving two end portions of the metal wire member;
      a second loop formed by the metal wire member; and
      a pinch portion for enabling a pinch force to be applied to the shaft fixing clip to expand the second loop, said pinch portion being monolithically formed with the second loop;
   a bush comprising:
      a cylindrical portion for keeping close contact with an inner periphery of the bracket;
      a flange that is formed on one end of the cylindrical portion and is engaged with the bracket;
      an axial direction slit that is formed along an axial direction from the cylindrical portion to the flange; and
      a pair of circumferential slits that are circumferentially formed and respectively in opposite diametrical sides of the cylindrical portion perpendicular to the axial direction slit;

said shaft inserted inside said bush to be fixed by the shaft fixing structure, the shaft comprising a groove into which said shaft fixing clip is fitted; and a peripheral wall that extends from a bush tip end opposite to the flange to the pair of circumferential slits, wherein the end portions of the metal wire member are crossed in an end portion of the second loop to respectively protrude toward diametrical sides, wherein tip ends of the end portions are bent, wherein the second loop that is positioned on a side of the end portions is configured as a shaft clamping portion, wherein bent portions of the tip ends of the end portions are configured as the pinch portion, wherein the pinch portion is bent in an axial direction of the shaft such that the clip fits the shaft, wherein the shaft fixing clip is fittingly attached to the circumferential slits, and wherein portions of the peripheral wall, corresponding to middle portions of the pair of circumferential slits and extending from the bush tip end to the pair of circumferential slits, are thinned to form parallel chords to reduce an outer diameter of the peripheral wall and to reduce an amount of the pinch force required to expand the second loop for passing over the outer diameter of the peripheral wall compared to an amount of the pinch force required without the thinning of the portions of the peripheral wall.

2. The shaft fixing structure according to claim 1, wherein the metal wire member comprises a spring steel wire.

3. The shaft fixing structure of claim 1, wherein the flange extends in an outer radial direction from the end portion of the cylindrical portion.

4. The shall fixing structure of claim 3, wherein the flange has a circular shape.

5. The shaft fixing structure of claim 1, wherein said first and second loops comprise closed loops.

6. The shaft fixing structure of claim 1, wherein said first and second loops comprise completed loops.

7. The shaft fixing structure of claim 1, wherein said second loop is fined into said pair of circumferential slits.

8. The shaft fixing structure according to claim 1, further comprising:

a convex portion that is to be engaged wit a peripheral edge of the bracket and formed circumferentially between the pair of circumferential slits, wherein the convex portion is projected from a circumferential surface of the cylindrical portion.

9. A shaft fixing structure, comprising:

a shaft fixing clip comprising:

a first loop at a middle of a metal wire member leaving two end portions of the metal wire member;

a second loop formed by the metal wire member; and a pinch portion for enabling a pinch force to be applied to the shaft fixing clip to expand the second loop, said pinch portion being monolithically formed with the second loop;

a bush comprising:

a cylindrical portion having a diameter that is reducible by deformation;

a flange that is formed on one end of the cylindrical portion;

an axial direction slit that is formed along an axial direction from the cylindrical portion to the flange, said axial direction slit enabling the diameter of the cylindrical portion to be reducible by deformation; and a pair of circumferential slits that are circumferentially formed and respectively in opposite diametrical sides of the cylindrical portion perpendicular to the axial direction slit;

a shaft inserted inside said bush to be fixed by the shaft fixing structure, the shaft comprising a groove into which said shaft fixing clip is fitted; and a peripheral wall that extends from a bush tip end opposite to the flange to the pair of circumferential slits, wherein the end portions of the metal wire member are crossed in an end portion of the second loop to respectively protrude toward the diametrical sides, wherein tip ends of the end portions are bent, wherein the second loop that is positioned on a side of the end portions is configured as a shaft clamping portion, wherein bent portions of the tip ends of the end portions are configured as the pinch portion, wherein the pinch portion is bent in an axial direction of the shaft such that the shaft fixing clip fits the shaft, wherein the shaft fixing clip fittingly attaches to the circumferential slits formed in the cylindrical portion, and wherein portions of the peripheral wall, corresponding to middle portions of the pair of circumferential slits and extending from the bush tip end to the pair of circumferential slits, are thinned to form parallel chords to reduce an outer diameter of the peripheral wall and to reduce an amount of the pinch force required to expand the second loop for passing over the outer diameter of the peripheral wall compared to an amount of the pinch force required without the thinning of the portions of the peripheral wall.

* * * * *